3,273,806
TREATMENT OF PHOSPHORS
Yonesaku Aoki and Masayuki Emoto, Kitatama-gun, Tokyo-to, and Tetsuro Tanaka, Hachioji-shi, Tokyo-to, Japan, assignors to Kabushiki Kaisha Hitachi Seisakusho, Tokyo-to, Japan, a joint-stock company of Japan
Filed Sept. 11, 1962, Ser. No. 222,918
Claims priority, application Japan, Sept. 11, 1961, 36/32,159
9 Claims. (Cl. 241—20)

This invention relates to a method of improving the luminous efficiency of phosphors.

A phosphor, for example, a halophosphate phosphor, is ordinarily prepared by thoroughly mixing the component starting materials and firing the mixture at a temperature within the range of approximately 1,100° C. through 1,200° C. When the material thus prepared is to be applied to the surface of a discharge lamp bulb, however, it is ordinarily necessary to grind the phosphor to an average particle size of approximately 5 microns or finer in order to obtain a good fluorescent film coating surface. However as a result of this grinding, the luminous efficiency is ordinarily lowered by approximately 10%, which cannot be avoided.

As attempts to reduce the above-mentioned lowering of the luminous efficiency due to grinding, synthetic methods have been proposed whereby a two-stage firing method, for example, such as that specified in Japanese patent application No. 154/1961, is used, the particle size of the phosphor is made as small as possible, and, at the same time, lowering of the luminous efficiency is prevented. Such a method, however, has the disadvantage of requiring two firing steps in a non-oxidizing atmosphere at 1,000° C. or higher.

As a result of extensive studies by the present applicants of the causes of the above-mentioned lowering of luminous efficiency, it has been found that when the phosphor has been ground to an average particle size, for example, of the order of 5 microns, finer particles of the order of, for example, 0.5 micron, are adhering around the particles of approximately 5 microns; and it has been verified that the aforesaid lowering of luminous efficiency is due to scattering of ultra-violet light by these finer particles.

It is an essential object of the present invention to improve the luminous efficiency of phosphors by separating and removing the finer particles below 0.5 micron by utilizing a suitable dispersing agent.

More specifically, it is an object of the present invention to provide a method of grinding said material to an amply fine particle size sufficient to prepare a coating solution adapted to obtain an excellent coated surface of phosphor film and treating the resulting material with a suitable dispersing agent, thereby separating and removing the aforesaid finer particles of phosphor, and improving the luminous efficiency.

It has been found that, by the practice of the treatment method according to the present invention, an increase in luminous efficiency of 10% or higher is attained, and it is possible to recover or even surpass the luminous efficiency obtainable prior to grinding.

The treatment according to this invention can be accomplished by an extremely simple process, comprising merely agitating the phosphor for twenty to sixty minutes in a normal solution of the order of 0.01 of a dispersing agent to obtain good dispersion, leaving the solution standing so as to permit the larger particles to settle, then removing the liquid phase by decantation, and filtering and drying the residue. It has been found that there is little difference in effectiveness in this process regardless of whether the concentration of the dispersing agent is low or high.

The nature and details of the invention will be more clearly apparent by reference to the following description when taken in conjunction with the accompanying illustrations in which.

The case of application of the invention to a halophosphate phosphor, as an example, will now be described. Since this phosphor material forms colloidal particles, an anionic surface-active agent or non-ionic surface-active agent is also effective, in addition to such an inorganic chemical as sodium hexametaphosphate to be used as a dispersing agent. A cationic surface-active agent, however, is detrimental in this case.

As a result of extensive experiments, it has been found that the following dispersing agents are especially effective for use in the method of this invention:

Soluble phosphates such as sodium hexametaphosphate ($(NaPO_3)_6$), potassium hexametaphosphate ($(KPO_3)_6$), disodium phosphate ($Na_2HPO_4$), dipotassium phosphate ($K_2HPO_4$), diammonium phosphate ($(NH_4)_2HPO_4$), sodium pyrophosphate ($Na_4P_2O_7$), potassium pyrophosphate ($K_4P_2O_7$), sodium hypophosphate ($Na_2H_2P_2O_6$), potassium hypophosphate ($K_2H_2P_2O_6$), disodium orthophosphite ($Na_2HPO_3$), dipotassium orthophosphite ($K_2HPO_3$), sodium hypophosphite ($NaH_2PO_2$), and potassium hypophosphite ($KH_2PO_2$); soluble borates such as sodium tetraborate ($Na_2B_4O_7 10H_2O$) and potassium tetraborate ($K_2B_4O_7 10H_2O$); soluble silicates such as sodium metasilicate ($Na_2SiO_3$) and potassium metasilicate ($K_2SiO_3$); inorganic dispersing agents such as ammonium chloride ($NH_4Cl$), alkaline hydroxide ($NaOH$, $KOH$), and ammonium hydroxide ($NH_4OH$); as well as anionic surface-active agents such as sodium dioctylsulfosuccinate ($NaO_3SCHCOOC_8H_{17}$—$CH_2COOC_8H_{17}$), sodium octylsulfate ($C_8H_{17}$—$SO_4Na$), sodium dodecylsulfate $$(C_{12}H_{25}\text{—}SO_4Na)$$

or "Neokooru S" (registered trademark), and surface-active agents such as "Pegunooru" (registered trademark), "Niyuuron N" (registered trademark), and "Burenooru I" (registered trademark).

In the case of certain kinds of dispersing agents, the use of two or more kinds of these dispersing agents in the form of a mixture is effective and results in an increase in luminous efficiency which is substantially greater than that in the case wherein the dispersing agents are used singly.

While the afore-mentioned rise in luminous efficiency is a result relating to pulverized phosphor materials, a rise in luminous efficiency which is similar to that in the case of pulverized phosphor materials can be obtained also in the case wherein a phosphor which has been treated according to the invention is utilized in a fluorescent lamp. Moreover, a uniform fluorescent film is obtained, which produces a clean outer appearance.

Figure 1:
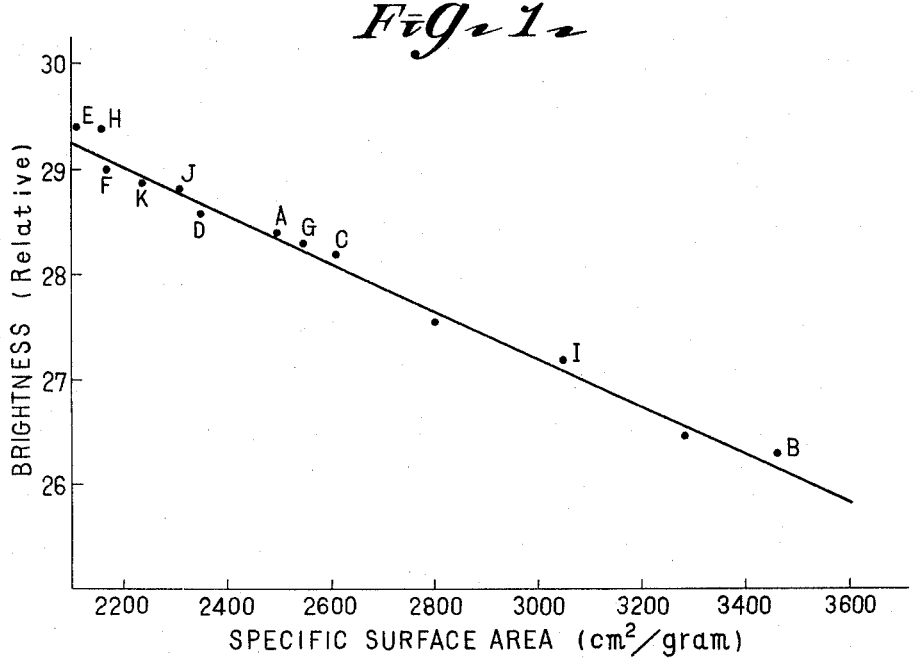
FIG. 1 is a graphical representation indicating the relation between the brightness and specific surface area due to the air permeation method of a phosphor material obtained through the treatment method of the invention.

In FIG. 1, there is indicated the relation between the brightness and the specific surface area, due to the air-permeation method, of phosphors obtained by the treatment of this invention through the use of various dispersing agents on phosphor from the same lot obtained by pulverizing. (Here, the specific surface area is calculated from the ease with which air passes through a compressed body or bed which has been formed by compressing a certain quantity of pulverized material to a certain volume, and which has a certain porosity, this measurement method being specified in Japanese Industrial Standards Designation R 5201 as a method of measuring the degree of pulverization of cement.)

In FIG. 1, the designations of the reference characters A through K are as follows:

A, phosphor material prior to grinding;
B, phosphor material subsequent to grinding;
C, sodium hexametaphosphate;
D, ammonium phosphate;
E, ammonium tetraborate;
F, potassium silicate;
G, ammonium hydroxide;
H, mixture of solutions of sodium hexametaphosphate and ammonium hydroxide;
I, sodium dioctylsulfosuccinate;
J, mixture solution of sodium dioctylsulfosuccinate and sodium hexametaphosphate; and
K, mixture solution of sodium dioctylsulfosuccinate and ammonium hydroxide.

Reference characters B through K designate points corresponding to measured values for the case wherein the phosphor materials have been treated according to the invention subsequent to grinding.

It is apparent from FIG. 1 that when a phosphor material after grinding is treated with a dispersing agent as above-mentioned, the luminous efficiency rises, the specific surface area is reduced, and, moreover, the points corresponding to the various materials fall on positions which are on an approximately straight line.

Considering the case wherein the phosphor is treated with sodium dioctylsulfosuccinate, it will be seen that the specific surface area is reduced 12 percent, and the brightness is increased approximately 3 percent. That is, if a reduction of the order of 10 percent occurs in the specific surface area, a rise of ample significance in the luminous efficiency can be obtained.

In the case of measurement of the spcific surface area of a pulverized material by the air permeation method, if the pulverized material in which large particles and extremely fine particles are coexisting, is compressed and molded, the fine particles will fill the voids created by the large particles. For this reason, the specific surface area measured by the said method will become large, and, if the fine particles are removed, the specific surface area will become small.

The foregoing fact is apparent also from the following consideration. Photographs have shown that, by the treatment according to this invention, fine particles of the order of 0.5 micron or less which were mixed with the large phosphor particles or adhering to the surfaces thereof have been removed in an extremely effective manner, and, for this reason, the specific surface area has been reduced.

Figure 2:
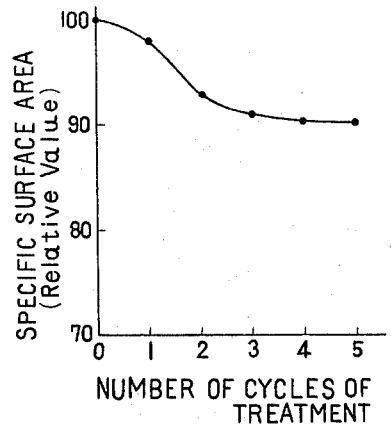
FIG. 2 is a graphical representation indicating the relation between the number of treatments and the specific surface area in the case of a phosphor treated with distilled water.

On one hand, while the specific surface area is reduced, as shown in FIG. 2, also by treating a phosphor material with distilled water which does not contain a dispersing agent, the degree of this reduction is substantially less than that in the case wherein a dispersing agent is used, being merely of the order of 10 percent even with four or five cycles of treatment. Furthermore, whereas in the case wherein a dispersing agent is used, the rise in brightness is approximately 10 percent, the rise in brightness due to this treatment with distilled water is limited to 2 to 3 percent, and any further effect cannot be expected. This is, the reduction of 10 percent or more in the specific surface area is due to the effect of a dispersing agent and has ample significance also in the increase in luminous efficiency.

Figure 3:
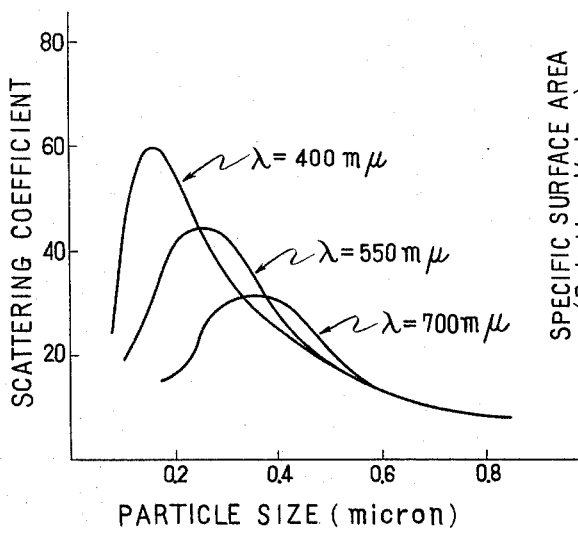
FIG. 3 is a graphical representation indicating the relation between the scattering coefficient and particle size of zinc oxide.

FIG. 3 is a graphical representation indicating the relation between the scattering coefficient and particle size of zinc oxide, taken from "Shin Kagaku Kogaku" (New Chemical Engineering Courses), volume 4, page 5, published by the Nikkan Kogyo Shimbun Sha. This graph shows the results of experiments on zinc oxide, but this relation is similarly valid also in the case of other substances.

From FIG. 3, it is apparent that the curves of scattering coefficient versus particle size have maximum points at certain particle size values depending on the wavelength of the light source. With decreasing wavelength, this maximum point shifts in position toward the direction of diminishing particle size, and, simultaneously, its value, that is, its reflective power, becomes large. For example, as in a fluorescent discharge lamp, in the case of ultraviolet rays of 253.7 m$\mu$ wavelength due to mercury discharge, the maximum point of the scattering coefficient occurs at a position corresponding to a particle size of 0.1 micron or smaller, and its value is greater than that in the case of a longer wavelength.

For this reason, fine particles of a phosphor material as described above have a remarkably high reflective power with respect to stimulative ultraviolet rays. It appears, moreover, that since these particles include therewithin particles of low luminous efficiency, the effective luminous efficiency of the phosphor material is greatly lowered.

While, in the foregoing disclosure, the case of halophosphate phosphor materials has been described, it has been found that such phosphor materials of the oxide group as calcium phosphate-Sn; strontium magnesium phosphate-Sn; calcium tungstate; magnesium tungstate; zinc silicate-Mn; and calcium silicate-PbMn; upon being similarly treated according to the method of this invention, are also improved in luminous efficiency.

It has been found, furthermore, that sulfide phosphors such as zinc sulfide-Ag can also be improved in luminous efficiency in a similar manner by using suitable dispersing agents.

In Table 1 are shown comparative values of luminous efficiency for a halophosphate phosphor prior to pulverization, after pulverization, and after treatment with various dispersing agents subsequent to pulverization.

TABLE 1

| Symbol | Treatment | Luminous Efficiency |
| --- | --- | --- |
| A | Prior to pulverization | 28.2 |
| B | After pulverization | 26.3 |
| C | Sodium hexametaphosphate | 28.2 |
| D | Ammonium phosphate | 28.6 |
| E | Ammonium tetraborate | 29.4 |
| F | Potassium silicate | 29.0 |
| G | Ammonium hydroxide | 28.3 |
| H | Mixture of sodium hexametaphosphate plus ammonium hydroxide | 29.4 |
| I | Sodium dioctyl sulfosuccinate | 27.2 |
| J | Mixture of sodium dioctylsulfosuccinate plus sodium hexametaphosphate | 28.8 |
| K | Mixture of sodium dioctylsulfosuccinate plus ammonium hydroxide | 28.9 |

In Table 1, the specimens designated by A and B are, respectively, phosphors prior to an after pulverization, and specimens C through K, inclusive, are phosphors prepared by treating B with the respective dispersing agents indicated in the table. Of these specimens, C, D, E, F, H, and K will be described hereinafter with respect to representative examples. The other specimens are phosphors treated with the following agents: G, 0.01 normal solution ammonium hydroxide; I, 0.2% aqueous solution of sodium dioctylsulfosuccinate; and J, solution containing 0.2% sodium dioctylsulfosuccinate and 0.005 normal sodium hexametaphosphate.

In order to indicate still more fully the nature of the present invention, the following typical examples are set forth, it being understood that these examples are presented as illustrations only, and that they are not intended to limit the scope of the invention.

Example 1

100 grams of a halophosphate phosphor ground to an average particle size of approximately 5 microns were added to 1 liter of a 0.005 normal solution of sodium hexametaphosphate, and the mixture was agitated for approximately 30 minutes with a magnetic stirrer or agitator so as to attain thorough dispersion. Then, after the mixture had been left standing for approximately one hour, it liquid phase was removed by decantation, and the residue was washed well and dried. The phosphor thus treated recovered its luminous efficiency prior to pulverization, as indicated by specimen C in Table 1.

Example 2

100 grams of a halophosphate phosphor ground to an average particle size of approximately 5 microns were added to 1 liter of a 0.002 normal solution of ammonium phosphate, and the mixture was agitated for approximately 30 minutes with a magnetic stirrer or agitator so as to attain thorough dispersion. Then, after the mixture had been left standing for approximately one hour, its liquid phase was removed by decantation, and the residue was washed well and dried. The phosphor thus treated exhibited a luminous efficiency exceeding that of the phosphor prior to pulverization, as indicated by specimen D in Table 1.

Example 3

100 grams of a halophosphate phosphor ground to an average particle size of approximately 5 microns were added to 1 liter of a 0.005 normal solution of ammonium tetraborate, and the mixture was agitated for approximately 30 minutes with a magnetic stirrer or agitator so as to attain thorough dispersion. Then, after the mixture had been left standing for 24 hours, its liquid phase was removed by decantation, 1 liter of distilled water was further added to the residue, and the mixture was again agitated to achieve good dispersion. The mixture was then left standing for 1 hour, after which it was filtered, washed well and dried. The phosphor thus treated exhibited a rise of approximately 12% in luminous efficiency as indicated by specimen E in Table 1.

Example 4

100 grams of a halophosphate phosphor ground to an average particle size of approximately 5 microns were added to 1 liter of a 0.005 normal solution of potassium silicate, and the mixture was agitated for approximately 30 minutes with a magnetic stirrer or agitator so as to attain thorough dispersion. Then, after the mixture had been left standing for 24 hours, the liquid phase in which fine particles were suspended was removed by decantation. One liter of distilled water was added to the residue, and the mixture was agitated again to achieve good dispersion. Then after the mixture was left standing for one hour, it was filtered, washed well, and dried. The phosphor thus treated exhibited a great rise in luminous efficiency, as indicated by specimen F in Table 1.

Example 5

100 grams of a halophosphate phosphor ground to an average particle size of approximately 5 microns were added to 1 liter of a solution containing 0.005 normal sodium hexametaphosphate and 0.001 normal ammonium hydroxide, and the mixture was agitated for approximately 30 minutes with a magnetic stirrer or agitator so as to attain thorough dispersion. Then, after the mixture had been left standing for 1 hour, its liquid phase was removed by decantation, and the residue was washed well and dried. The phosphor thus treated exhibited a great rise in luminous efficiency, as indicated by specimen H in Table 1.

Example 6

100 grams of a halophosphate phosphor ground to an average particle size of approximately 5 microns were added to 1 liter of a solution containing 0.2% sodium dioctylsulfosuccinate and 0.001 normal ammonium hydroxide, and the mixture was agitated with a magnetic stirrer or agitator for approximately 30 minutes so as to attain thorough dispersion. Then, after the mixture had been left standing for approximately 1 hour, it was filtered, and the residue was washed well and dried. The phosphor thus treated exhibited a rise in luminous efficiency of approximately 10%.

Example 7

100 grams of a strontium magnesium phosphate-Sn phosphor were added to 1 liter of a 0.005 normal solution of ammonium phosphate, and the mixture was agitated with a magnetic stirrer or agitator for approximately 03 minutes so as to achieve thorough dispersion. Then, after the mixture had been left standing for approximately 2 hours, the liquid phase was removed by decantation, and the residue was washed well and dried. The foregoing treatment caused a rise of approximately 10% in the luminous efficiency of the phosphor.

Example 8

100 grams of a zinc silicate-Mn phosphor ground to an average particle size of approximately 5 microns were added to 1 liter of a 0.001 normal solution of potassium silicate, and the mixture was agitated with a magnetic stirrer or agitator for approximately 30 minutes so as to achieve thorough dispersion. Then, after the mixture was left standing for 24 hours, its liquid phase had been removed by decantation, and the residue was washed well and dried. The foregoing treatment caused a great rise in the luminous efficiency of the phosphor.

In the foregoing disclosure, cases wherein water is used as the dispersion medium have been described. However, it is possible to use, in addition, such organic solvents as methanol, ethanol, propanol, butanol, ethyl acetate, and butyl acetate as dispersion media. It has been found that these organic solvents, when used thus, are especially effective in the cases of neutral surface-active agents such as the afore-mentioned "Burenooru I" and "Pegunooru."

When an organic solvent is used in this manner, the dissolving of the phosphor is not considered at all, and from this point, also, it will be seen that the effectiveness of the treatment method according to this invention is not due to the dissolving of the fine particles of the phosphor material but is due to the separation and removal due to dispersion effect.

Example 9

100 grams of a halophosphate phosphor ground to an average particle size of 5 microns were added to 1 liter of a 1% solution of "Burenooru" in butyl acetate, and the mixture was agitated with a magnetic agitator for approximately 30 minutes so as to achieve thorough dispersion. Then, after the mixture had been left standing for one hour, its liquid phase was removed by decantation, and the residue was filtered, washed well with butyl acetate, and dried. Through the above treatment, the luminous efficiency of the phosphor was increased 7%.

Although this invention has been described with respect to particular examples thereof, a great number of anionic or non-ionic surface-active agents and inorganic dispersing agents are effective as the dispersing agents to be used, and it is possible to use various combinations of such factors as the combination of two or more kinds of these agents to be used together, concentration, treatment time, and treatment temperature. Accordingly, the present invention is not to be limited to the details presented herein as changes and modifications may be made therein which are within the full intended scope of the invention, as defined by the appended claims.

What is claimed is:
1. A method of treating phosphor materials, which comprises pulverizing a phosphor material to the ulti- mate size desired, subsequently subjecting said phosphor material thus pulverized to a dispersion treatment for substantially 30 minutes in a solution containing beside solvent at least one dispersing agent selected from the group consisting of inorganic dispersing agents, anionic and non-ionic surface-active agents, allowing the dispersed phosphor particles to settle for not more than 24 hours, separating and removing fine phosphor particles of a size of 0.5 micron and less, then drying the remaining phosphor.

2. A method of treating phosphor materials prior to the preparation of a coating therefrom, which comprises pulverizing a phosphor material to the ultimate size desired, subsequently subjecting substantially 100 g. of said phosphor material thus pulverized to a dispersion treatment for substantially 30 minutes in substantially one liter of a solution containing besides solvent at least one dispersing agent selected from the group consisting of inorganic dispersing agents, anionic and non-ionic surface-active agents, allowing the dispersed phosphor particles to settle for not more than 24 hours, separating and removing fine phosphor particles of a size of 0.5 micron and less, then drying the remaining phosphor.

3. The method as defined in claim 2, wherein said inorganic dispersing agents are selected from the group consisting of sodium hexametaphosphate, potassium hexametaphosphate, disodium phosphate, dipotassium phosphate, diammonium phosphate, sodium pyrophosphate, potassium pyrophosphate, sodium hypophosphate, potassium hypophosphate, disodium orthophosphite, dipotassium orthophosphite, sodium hypophosphite, potassium hypophosphite, sodium tetraborate, potassium tetraborate, sodium metasilicate, potassium metasilicate, ammonium chloride, sodium hydroxide, potassium hydroxide, ammonium hydroxide.

4. A method of treating phosphor materials, which comprises pulverizing the bulk of a phosphor material to a size of substantially 5 microns whereby inevitably a slight amount of said material obtains a smaller particle size, subsequently subjecting said pulverized phosphor material to a dispersion treatment for substantially 30 minutes in a solution containing besides solvent at least one dispersing agent selected from the group consisting of inorganic dispersing agents, anionic and non-ionic surface-active agents, allowing the dispersed phosphor particles to settle for not more than 24 hours, separating and removing fine phosphor particles of a size of 0.5 micron and less, and drying the remaining phosphor.

5. A method of treating phosphor materials, prior to the preparation of a coating therefrom, which comprises pulverizing the bulk of a phosphor material to a particle size of substantially 5 microns whereby inevitably a small amount of said material obtains a smaller particle size, subsequently subjecting substantially 100 g. of said pulverized phosphor material to a dispersion treatment for substantially 30 minutes in substantially one liter of a solution containing besides solvent at least one dispersing agent selected from the group consisting of inorganic dispersing agents, anionic and non-ionic surface active agents, allowing the dispersed phosphor particles to settle for not more than 24 hours, separating and removing fine phosphor particles of a size of 0.5 micron and less, and drying the remaining phosphor.

6. A method of treating phosphor materials, which comprises pulverizing the bulk of a phosphor material to a size of substantially 5 microns whereby inevitably a slight amount of said material obtains a smaller particle size, subsequently subjecting said pulverized phosphor material to a dispersion treatment for substantially 30 minutes in a solution consisting of a solvent selected from the group consisting of water, methanol, ethanol, propanol, butanol, ethyl acetate, and butyl acetate, and containing at least one dispersing agent selected from the group consisting of inorganic dispersing agents, anionic and non-ionic surface-active agents, allowing the dispersed phosphor to settle for not more than 24 hours, separating and removing fine phosphor particles of a size of 0.5 micron and less, and drying the remaining phosphor.

7. A method of treating phosphor materials prior to preparation of a coating therefrom, which comprises pulverizing a phosphor material to a size of substantially 5 microns whereby inevitably a small amount of said material obtains a smaller particle size, subsequently subjecting substantially 100 g. of said pulverized phosphor to a dispersion treatment for substantially 30 minutes in substantially one liter of a solution consisting of a solvent selected from the group consisting of water, methanol, ethanol, propanol, butanol, ethylacetate and butyl acetate, and containing at least one dispersing agent selected from the group consisting of inorganic dispersing agents, anionic and non-ionic surface-active agents, allowing the dispersed phosphor to settle for not more than 24 hours, separating and removing fine phosphor particles of a size of 0.5 micron and less, and drying the remaining phosphor.

8. A method of treating phosphor materials, which comprises pulverizing the bulk of a phosphor material to a size of substantially 5 microns whereby inevitably a slight amount of said material obtains a smaller particle size, subsequently subjecting said pulverized phosphor material to a dispersion treatment by agitating it for approximately 20 to 60 minutes in a solution consisting of a solvent selected from the group consisting of water, methanol, ethanol, propanol, butanol, ethyl acetate, and butyl acetate, and containing at least one dispersing agent selected from the group consisting of inorganic dispersing agents in amounts ranging from 0.001 to 0.005 normal, and anionic and non-ionic surface-active agents in amounts of 0.2 to 1 percent, allowing the dispersed phosphor particles to settle for a period of not more than 24 hours, separating and removing phosphor particles of a size of 0.5 micron and less, and drying the remaining phosphor.

the preparation

9. A method of treating phosphor materials prior to the preparation of a luminous coating therefrom, which comprises pulverizing a phosphor material to a particle size of substantially 5 microns whereby inevitably a slight amount of said material obtains a smaller particle size, subsequently subjecting substantially 100 g. of said pulverized phosphor material to a dispersion treatment by agitating it for approximately 20 to 60 minutes in substantially one liter of a solution consisting of a solvent selected from the group consisting of water, methanol, ethanol, propanol, butanol, ethyl acetate, and butyl acetate, and containing at least one dispersing agent selected from the group consisting of inorganic dispersing agents in amounts ranging from 0.001 to 0.005 normal, and anionic and non-ionic surface-active agents in amounts of substantially 0.2 to 1 percent; allowing the dispersed phosphor particles to settle for a period of not more than 24 hours, separating and removing phosphor particles of a size of 0.5 micron and less; and drying the remaining phosphor.

References Cited by the Examiner

UNITED STATES PATENTS

| 2,962,616 | 11/1960 | Homer et al. | 252—301.4 |
| 2,987,414 | 6/1961 | Martyny | 117—33.5 |
| 3,165,269 | 1/1965 | Blackburn | 241—21 X |

ROBERT C. RIORDON, Primary Examiner.

MAURICE A. BRINDISI, J. SPENCER, OVERHOLSER, Examiners.

LESTER M. SWINGLE, R. D. EDMONDS, H. F. PEPPER, Assistant Examiners.